US006440522B1

(12) United States Patent
Duschek et al.

(10) Patent No.: US 6,440,522 B1
(45) Date of Patent: Aug. 27, 2002

(54) METHOD AND DEVICE FOR PRODUCING A SECURITY ELEMENT AND A CORRESPONDING SECURITY ELEMENT

(75) Inventors: Detlef Duschek, Sensbachtal (DE); Gordon Klassen, Duarte, CA (US)

(73) Assignee: Meto International GmbH, Hirschhorn (DE)

( * ) Notice: Subject to any disclaimer, the term of this patent is extended or adjusted under 35 U.S.C. 154(b) by 0 days.

(21) Appl. No.: 09/380,600

(22) PCT Filed: Feb. 20, 1998

(86) PCT No.: PCT/EP98/00994

§ 371 (c)(1),
(2), (4) Date: Sep. 14, 1999

(87) PCT Pub. No.: WO98/41382

PCT Pub. Date: Sep. 24, 1998

(30) Foreign Application Priority Data

Mar. 14, 1997 (DE) ........................................ 197 10 600

(51) Int. Cl.[7] ........................ B29C 57/10; B29C 63/18; B29C 65/18

(52) U.S. Cl. ............................. 428/76; 2/260; 2/260.1; 156/213; 156/309.6; 156/272.4; 340/551; 340/572; 428/68; 428/611; 428/900; 428/928

(58) Field of Search ............................ 428/68, 76, 611, 428/928, 900; 2/260, 260.1; 156/213, 309.6, 272.4; 264/320, 322; 340/572, 551

(56) References Cited

U.S. PATENT DOCUMENTS

| | | | | |
|---|---|---|---|---|
| 3,929,943 A | | 12/1975 | Klimaszewski, Jr. | 264/25 |
| 4,126,372 A | * | 11/1978 | Hashimoto | 339/177 |
| 4,626,311 A | | 12/1986 | Taylor | 156/308.2 |
| 5,325,055 A | * | 6/1994 | Geringer | 324/173 |
| 5,605,768 A | | 2/1997 | Furukawa et al. | 428/611 |
| 5,650,236 A | | 7/1997 | Hirano et al. | 428/611 |

FOREIGN PATENT DOCUMENTS

| | | |
|---|---|---|
| DE | 1 172 035 | 6/1964 |
| DE | 8416578.2 | 9/1984 |
| DE | 8428610.5 | 1/1985 |
| DE | 3838662 A1 | 5/1990 |
| DE | 4438091 A1 | 4/1995 |
| EP | 0635811 A1 | 1/1995 |
| EP | 0773522 A1 | 5/1997 |
| JP | 8-85152 | 4/1996 |

OTHER PUBLICATIONS

Int'l. Prel. Exam. Report of Int'l. Appln. PCT/EP98/00994, Apr. 9, 1999 & its English translation.

* cited by examiner

*Primary Examiner*—Nasser Ahmad
(74) *Attorney, Agent, or Firm*—Jones, Tullar & Cooper, P.C.

(57) ABSTRACT

A method of producing a security element for electronically securing an object, a device for producing the security element and the security element itself form aspects of the present invention. The security element includes a strip element embedded in sheathing. The sheathing has a melting temperature below that of the strip element. The method has associated steps and the device has associated elements for producing the security element from the strip element and sheathing. In each aspect, the ends of the strip element and sheathing are heated and the sheathing ends pulled to seal the strip element in the sheathing.

11 Claims, 2 Drawing Sheets

METHOD AND DEVICE FOR PRODUCING A SECURITY ELEMENT AND A CORRESPONDING SECURITY ELEMENT

FIELD OF THE INVENTION

The present invention relates to a method and a device for producing a security element for electronically securing objects, as well as a corresponding security element.

BACKGROUND OF THE INVENTION

The security element is a so-called strip element—i.e. a low-retentivity magnetic metal strip, or a metal strip having a large Barkhausen effect—which, when an external magnetic alternating field is applied in a monitoring zone, is excited to emit a characteristic signal. The strip element has a sheath whose melting temperature lies below that of the melting temperature of the metal strip. In the same way, the security element can also be a so-called thin film security element, a resonance frequency security element or an accusto-magnetic security element.

Strip elements with plastic sheathing are already known and are used, inter alia, for the electronic securing of an object in the form of seed packaged in seed packages. In connection with this so-called source security, the strip elements are filled into the seed packages together with the seed.

For producing the security elements, a low-retentivity magnetic strip material or a strip material having a large Barkhausen effect is coated on both sides with a plastic foil and is subsequently divided into strip elements of the desired length. It is disadvantageous in connection with the known method, or respectively the security elements produced by means of the method, that the metal is exposed in the end areas and comes into contact with the goods to be secured. The use of the known security elements is not possible in many cases for reasons of customer protection.

SUMMARY OF THE INVENTION

The object of the present invention is to provide a method and a device for producing a completely encapsulated security element, as well as a corresponding security element.

Regarding the method, this object is attained by making available a strip element of a preselected length with the sheathing, or any other element for the electronic securing of objects; the sheathing is subsequently heated in the end areas and stretched in the longitudinal direction of the security element until it extends past the end areas of the security element.

In accordance with an advantageous, cost-efficient further development of the method in accordance with the present invention it is provided that a low-retentivity magnetic strip material or a strip material having a large Barkhausen effect, or a strip material which supports other security elements, is made available and is enclosed with a sheathing of plastic in an extrusion process. The strip material with the sheathing is subsequently separated into sections (strip elements) of a defined length.

Regarding the device for producing a security element for electronically securing an object, the object is attained in that the device has two clamping elements, which in a first position (I) clamp the end areas of the sheathed strip element (security element), that a translating mechanism is provided, which makes the clamping elements movable in the longitudinal direction of the clamped security element, that a heating device is provided, which heats at least the end areas of the strip element or other element for the electronic securing of an object, and that following heating of the end elements of the security element, the clamping elements are moved into a further position (II), which at least partially lies outside of the end areas of the strip element or other element for the electronic securing of an object, by means of which the heated and softened end areas of the sheathing are pulled over the ends of the strip element or the other element for the electronic securing of an object.

In accordance with an advantageous further embodiment of the device in accordance with the present invention it is provided that the heating device is integrated in the clamping elements. It has been shown to be particularly advantageous in this connection if the clamping elements are embodied so they can be electrically heated.

In the case of strip elements, an advantageous embodiment of the device of the present invention proposes that a strip, element is in the form of two clamping jaws arranged in a ring shape, which are resiliently seated with respect to each other. If another element for the electronic securing, of an object is encapsulated, the use of two clamping elements, which are arranged parallel with respect to each other, is recommended.

In accordance with a cost-effective embodiment of the device of the present invention it is provided that the control of the temperature of the heating device and/or of the translating mechanism is performed by a control unit.

Regarding the security element itself, the object is attained in that the melting temperature of the sheathing lies below the melting temperature of the strip element, and that the end areas of the sheathing are pulled over the ends of the strip element or the other element for the electronic securing of an object after appropriate heating, so that the strip element or the other element for the electronic securing of an object is completely sealed by the material of the sheathing. Because of the complete encapsulation of the the strip element or the other element for the electronic securing of an object from the goods to be secured, the security element of the present invention can be used without problems for any arbitrary employment.

BRIEF DESCRIPTION OF THE DRAWINGS

The invention will be described in greater detail by means of the following drawing figures. Shown are.

DESCRIPTION OF THE PREFERRED EMBODIMENT

Figure 1:
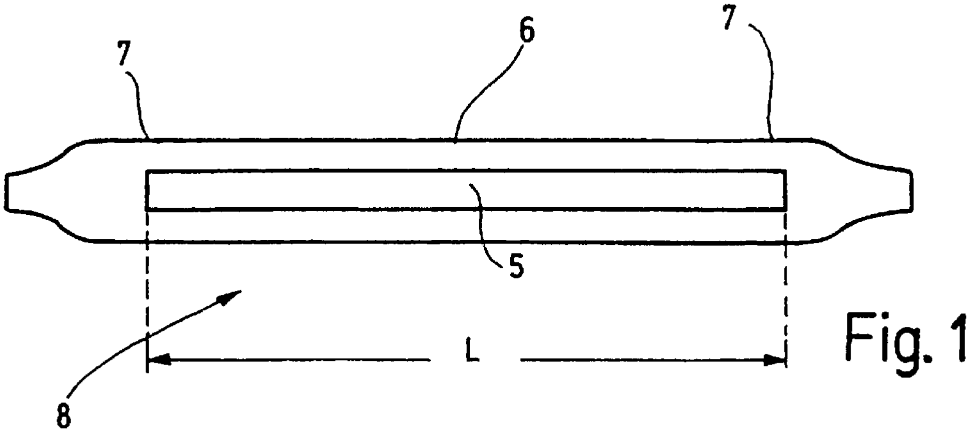
FIG. 1, which is a longitudinal sectional view through a security element of the present invention, FIG. 2, which is a perspective view of an embodiment of the device of the present invention, and FIG. 3, which is a flow diagram for executing the method in accordance with the present invention.

FIG. 1 represents a longitudinal sectional view through the security element 8 of the present invention. The security element 8 consists of a strip element 5 of a length L, which is completely sealed by the sheathing 6. For this purpose, the sheathing 6 was heated, at least in the end areas 7 of the strip element 5, and the softened material was pulled over the end areas 7 of the strip element 5.

Figure 2:
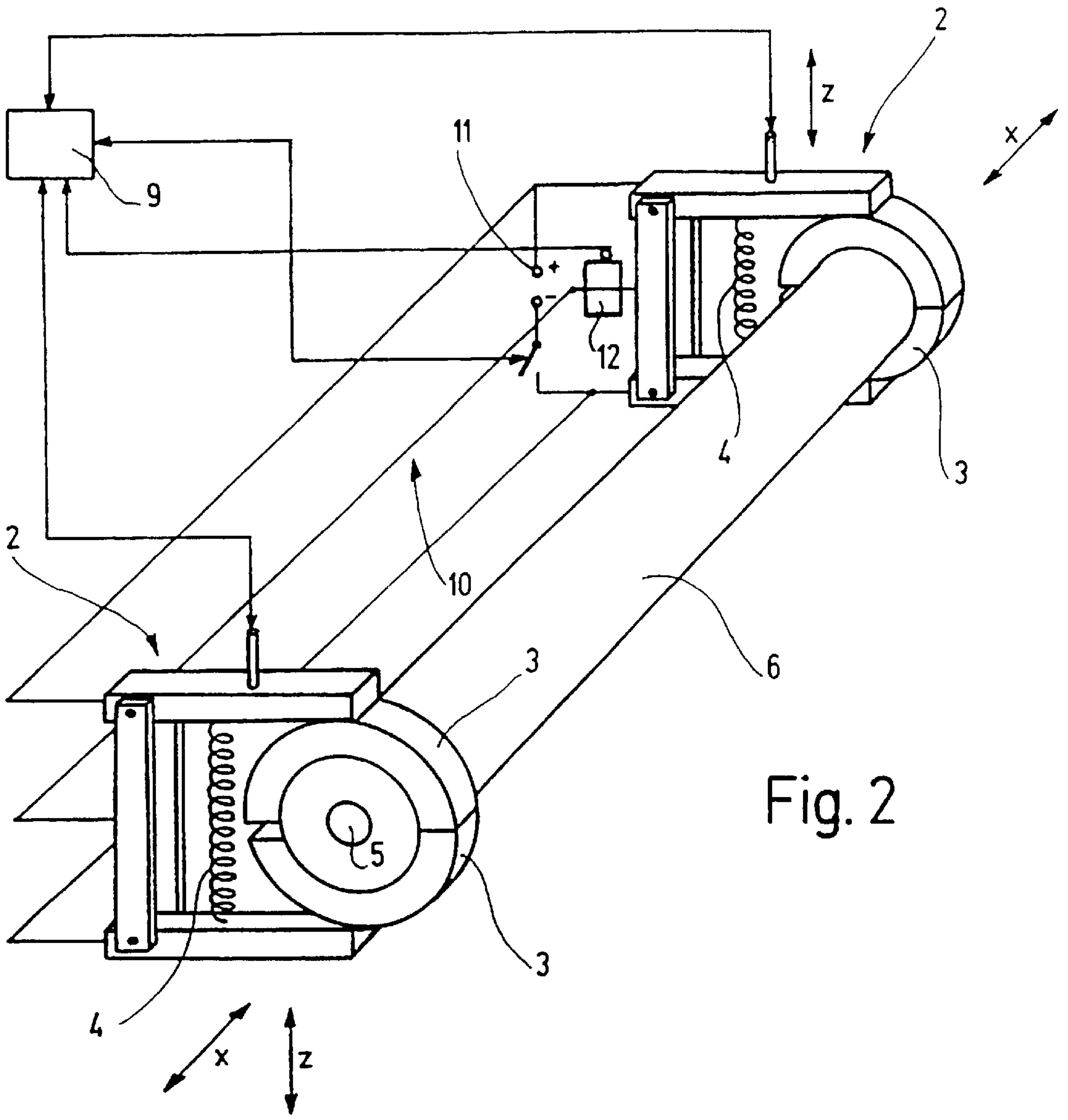

A perspective view of an embodiment of the device 1 of the present invention is represented in FIG. 2. The device 1 essentially consists of two clamping elements 2, which can be displaced in the X-direction in relation to each other by means of a translating mechanism 10. The movement itself is performed controlled by a motor. The size of the translating movement is determined by means of an angle transducer, not represented. A regulating/control unit 9 coordinates the course of movement of the device 1.

Each one of the two clamping elements 2 consists of two clamping jaws 3, which in the closed state are ring-shaped and are of such a dimension, that they can clamp a strip element 5. The two clamping jaws are connected with each other by means of springs 4. The closing and opening of the clamping jaws 3 of the clamping elements 2 in the Z-direction also is performed by means of the regulating/control unit 9.

In the illustrated case the clamping elements 2 are electrically heatable. The heating device 11 is switched on by the regulating/control unit 9 in such a way, that the sheathing 6 of the strip element 5 softens in the end areas 7. Subsequently the softened sheathing 6 is pulled in the X-direction over the end areas 7 of the strip element 5 by means of the translating movement of the two clamping elements in the X-direction, or respectively the minus X-direction.

Figure 3:
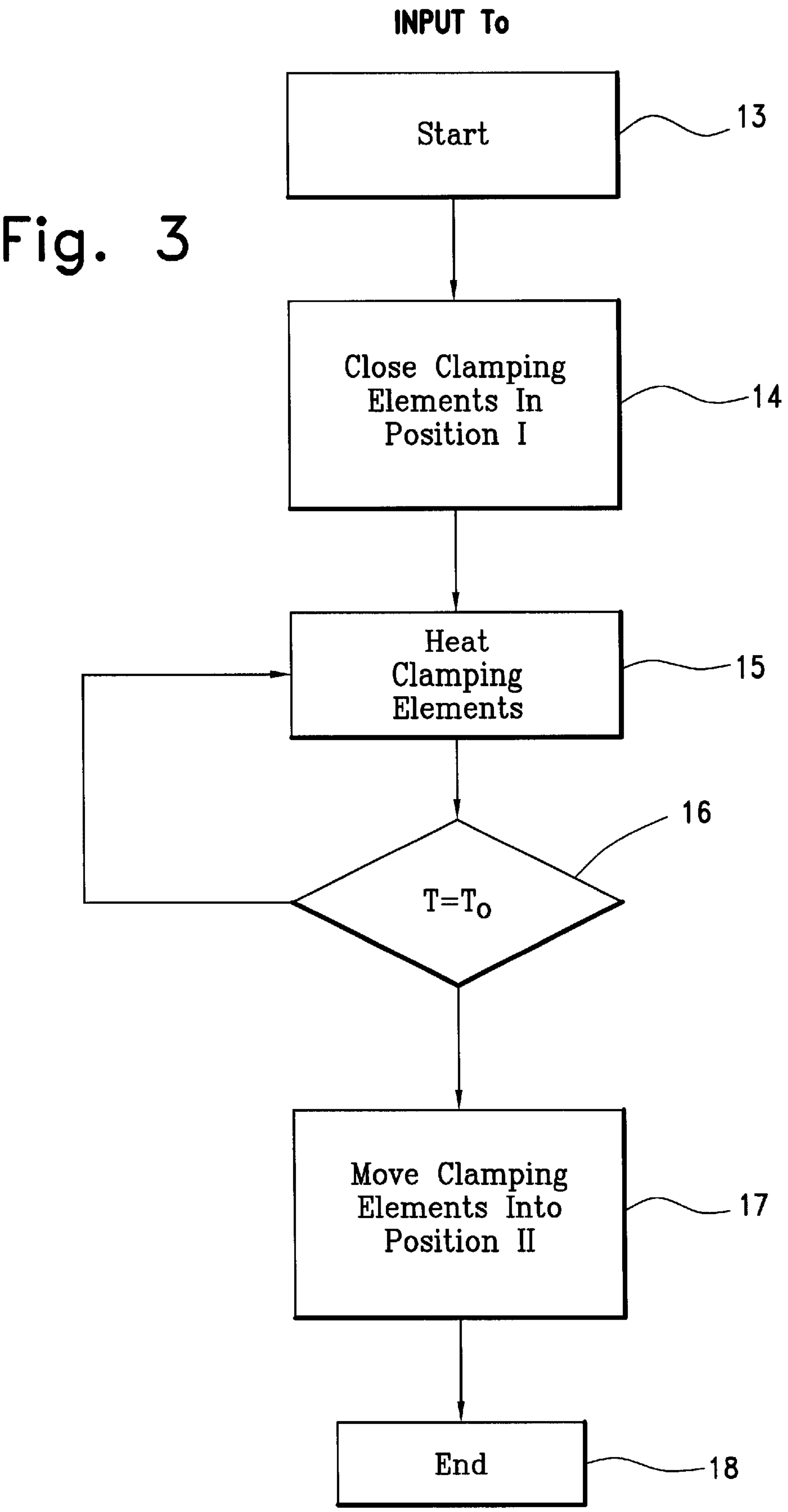

FIG. 3 shows a flow diagram for controlling the device 1 in accordance with the present invention. The temperature To, to which the sheathing 6 must be heated in the end areas 7 of the strip element 5 so that they are softened, is preselected in the control/regulating unit 9. The distance over which the translating mechanism 10 moves the clamping elements 3 is preselected in a hardware way by appropriate stopping mechanisms. The program is started at point 12. The strip element 5 with the sheathing 6 has been positioned between the clamping jaws 3 of the clamping elements 2, and the clamping jaws 3 of the two clamping elements 2 are moved toward each other. Subsequently the clamping jaws 3 are heated to the temperature To in accordance with program points 14, 15. As soon as the temperature To has been reached, and it has moreover been assured that the sheathing 6 in the end areas 7 of the strip element 5 has also reached the required temperature, the clamping elements 16 are moved apart at point 16 in the X-direction, or respectively the minus x-direction, over the preselected distance. By means of this the softened material of the sheathing 6 is pushed over the end areas 7 of the strip element 5, and the security element 8 of the invention is finished. The program is terminated at point 17.

What is claimed is:

1. A method for producing a security element for electronically securing an object, having a strip element and sheathing whose melting temperature lies below the melting temperature of the strip, element comprising the steps of:

providing a strip element of a preselected length defining a longitudinal direction, with a sheating, the strip element further defining end areas;

initially heating the strip element and sheathing at the end areas; and stretching the sheathing in the longitudinal direction past the end areas.

2. The method as defined in claim 1, wherein the sheating comprises plastic and the strip element comprises a soft magnetic strip material, and wherein the method further comprises the step of:

enclosing the strip element in the sheathing by an extrusion process.

3. The method as defined in claim 2, further comprising the step of:

separating the strip element with the sheathing into sections of defined length.

4. A device for producing a security element for electronically securing an object, the security element comprising a strip element defining end areas, and a sheathing in which the strip element is enclosed, the melting temperature of the sheathing lying below that of the strip element, the device comprising:

two clamping elements defining a first position at which the end areas of the sheathed strip element are clamped, the sheathed strip element defining a longitudinal direction;

a translating mechanism for moving said two clamping elements in the longitudinal direction of the clamped sheathed strip element;

a heating device for heating at least the end areas of the sheathed strip element; and means for pulling the clamping elements with the clamped sheathing at the heated end areas over the ends of the strip element to a second position, said second position lying at least partially outside of the end areas.

5. The device as defined in claim 4, wherein said heating device is integrated into two said clamping elements.

6. The device as defined in claim 4, wherein each clamping element includes two clamping jaws arranged in a ring shape, which are resiliently seated with respect to each other.

7. The device as defined in claim 6, further comprising:

a regulating unit for regulating the temperature control of said clamping elements and movement of said clamping jaws away from and toward each other.

8. A security element for the electronic security of articles, comprising:

a soft magnetic strip element; and a sheathing completely enclosing said strip element, wherein:

the melting temperature of said sheathing lies below that of said strip element; and said sheathing has tapered ends pulled over the ends of said strip element after heating thereby sealing said strip element in sheathing.

9. The method of claim 1 wherein the sheathing is pulled in the longitudinal direction over the end areas of the strip element.

10. The method of claim 9 wherein the sheathing encloses said end areas of the strip element.

11. The method of claim 2 wherein said soft magnetic strip material is a magnetically soft material.

* * * * *